3,210,331
DIMERIC BIS(CYCLOPENTADIENYL)BUTENES
AND PROCESS FOR THEIR PREPARATION
Alfred Renner, Allschwill, and Franz Rudolf Widmer, Basel, Switzerland, assignors to Ciba Limited, Basel, Switzerland, a company of Switzerland
Filed Dec. 10, 1962, Ser. No. 243,397
Claims priority, application Switzerland, Dec. 12, 1961, 14,360/61
3 Claims. (Cl. 260—93.1)

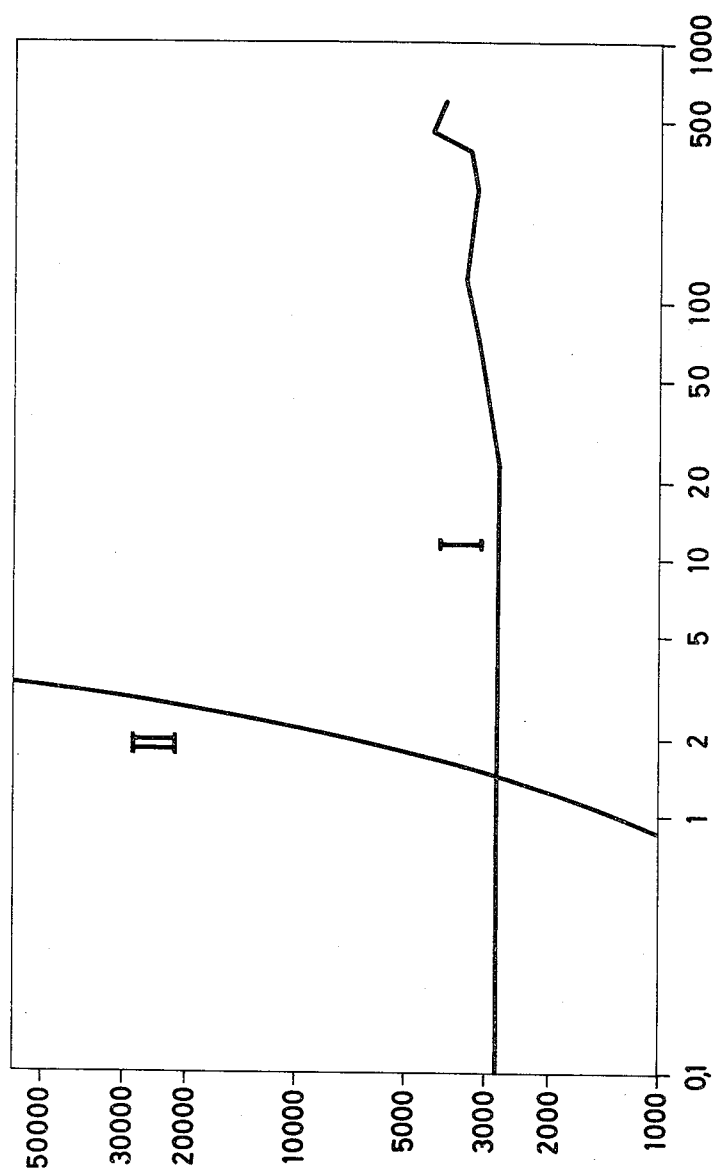

Examples X and XI of U.S. Patent Ser. No. 2,726,232, granted Dec. 6, 1955, to Robert W. Upson describe the manufacture of monomeric 1:4-bis-(cyclopentadienyl)-butene-2 by reacting 1:4-dichloro-2-butene with cyclopentadienyl potassium or cyclopentadienyl magnesium chloride in an inert organic solvent at 15 to 20° C. or at a moderately raised exothermic reaction temperature. The resulting unstable monomer can be isolated only by evaporation under vacuum and cooling to 0 to 10° C.

U.S. Patent No. 2,726,232 contains no mention concerning the possibility of the existence of a dimeric form of 1:4-bis(cyclopentadienyl)-butene-2. Moreover, in Example II of the said patent it has been proved that under analogous manufacturing conditions a reaction of cyclopentadienyl potassium and para-xylylene bromide furnishes a dimeric α:α′ - bis(cyclopentadienyl) - para-xylene; it can, therefore, be assumed that the U.S. patent would certainly not have failed to describe a dimeric form of 1:4-bis(cyclopentadienyl)-butene if the experiments described in it had suggested the existence of such a form.

Furthermore, the general introduction to U.S. Patent No. 2,726,232 contains the statement that still-meltable polymers of α:α′-bis(cyclopentadienyl)-para-xylene can be converted into infusible polymers by being heated for a short time at 50 to 300° C.

Since the chemist would have had to expect that 1:4-bis(cyclopentadienyl)-butene by reason of the presence of the additional reactive olefinic double bond in the butene residue would be chemically even far more unstable than α:α′-bis(cyclopentadienyl)-para - xylene, he could not have failed to deduce from this further that the unstable monomeric 1:4-bis(cyclopentadienyl)-butene on being heated beyond 50° C. would be directly transformed into an infusible product.

The applicants' own experiments with dimeric α:α′-bis(cyclopentadienyl)-para-xylene then revealed that the stability of this compound is rather limited, even at −40° C. While it is still just possible to cast it at 55° C. after having been stored for 50 days at −40° C., the casting cured at 150° C. is interspersed with fine air bubbles because, when the casting mold is heated to the curing temperature, the gelling process sets in so rapidly that the occluded bubbles of air have no chance of escaping in time. When this substance is stored at room temperature for only 8 days, it already turns into a viscous paste that can no longer be fused. After 15 days' storage at room temperature the substance forms a solid resin which softens at 70 to 75° C. but it can no longer be fused to form a castable liquid. Owing to this extremely limited pot life dimeric α:α′-bis(cyclopentadienyl)-para-xylene is, for example, quite unsuitable for use as a casting resin or the like.

As has been found by applicants' own experiments the same limited pot life is also found with other oligomeric bis(cyclopentadienyl) compounds, for example oligomeric 1:8-bis-cyclopentadienyl-octane or oligomeric 1:10-bis-cyclopentadienyl-decane, which substances form gels after about one week's storage at room temperature.

By analogy with the observations mentioned above concerning oligomeric bis(cyclopentadienyl) compounds in which the two cyclopentadiene radicals are linked together either through an unreactive saturated alkylene bridge or through an unreactive araliphatic bridge, a chemist would have to have assumed that an oligomeric bis(cyclopentadienyl)-butene—if such a compound existed at all—would be even much more unstable and accordingly quite unsuitable as a storable casting resin. This well-founded prejudice prevented the average chemist from even attempting to find a process for the manufacture of oligomeric bis(cyclopentadienyl)-butene, to say nothing of investigating more closely its technical properties.

It was, therefore, extremely surprising to find that when monomeric 1:4-bis(cyclopentadienyl)-butene-2 is heated to 70 to 150° C. a dimer is obtained which has a substantially unlimited pot life at room temperature. A specimen of this dimer displayed substantially no change after having been stored for 12 months at room temperature; the yellow liquid was still readily castable at room temperature and it was possible to cure it, for example by heating for 24 hours at 180° C., to form an infusible casting having the same outstanding mechanical and electrical properties as a freshly prepared specimen.

According, the present invention provides a process for the manufacture of dimeric 1:4-bis(cyclopentadienyl)-butene-2 by heating monomeric 1:4-bis(cyclopentadienyl)-butene-2 to 70 to 150° C.

According to a preferred variant of the present process the monomer is prepared in known manner, for example by reacting 1:4-dichloro-2-butene with cyclo-pentadienyl potassium or sodium or with cyclopentadienyl magnesium bromide, followed by heating of the reaction solution to 70 to 150° C. without previous isolation of the monomer.

By virtue of its substantially unlimited pot life at room temperature dimeric 1:4-bis(cyclopentadienyl)-butene-2 represents a stable, thermosetting one-component system for use, for example, as casting resin, lacquer, laminating resin or adhesive.

As mentioned above, dimeric 1:4-bis(cyclopentadienyl)-butene-2 can be transformed by heating at an elevated temperature into an insoluble and infusible resin suitable for a wide variety of uses.

Accordingly, another object of this invention is a process for the manufacture of cured, polymeric resins by heating dimeric 1:4-bis(cyclopentadienyl)-butene-2 to a temperature of at least 160° C. and preferably a temperature ranging from 180 to 220° C.

The term "curing" as used in this context signifies the transformation of the dimer referred to above into a cross-linked, insoluble and infusible resin.

As a rule the cross-linked, infusible products are manufactured at the same time as they are shaped to castings, foamed objects, mouldings, lacquer films, laminates, bonded objects and the like. The procedure used in this operation consists in pouring the dimer into moulds, alone or in combination with additive or modifiers conventionally used in the technology of the curable plastics, such as fillers, plasticisers, pigments, dye-stuffs, mould lubricants, flame-inhibitors or the like, or brushing it on to form coatings, or using it for joint grouting etc. and then curing it by heating.

The resulting cured resins possess good mechanical properties, outstanding stability towards chemical agents and excellent electrical properties. They are particularly suitable as electrical insulating materials which absorb only a minimum of field energy even in the range of extremely high field frequencies (for example $10^{10}$ cycles).

Parts and percentages in the following examples are by weight, and the relationship between part by weight and part by volume is the same as that between the kilogram and the liter.

EXAMPLE 1

276 parts of sodium metal are fused in 2080 parts of xylene, then finely dispersed and cooled. 35.5 parts of tertiary butanol and 0.5 part of phenyl-β-naphthylamine are then added and while externally cooling 872 parts of monomeric cyclopentadiene are stirred in dropwise at 45° C. The batch is kept for 14 hours at 20° C. under nitrogen. While the reaction mixture is stirred and cooled 712 parts of 1:4-dichlorobutene-(2) are added dropwise at 30 to 35° C., whereupon the temperature is raised and maintained for 3 hours at 105° C. Titration of the alkalinity and of the sodium chloride reveals that a quantitative conversion has taken place. The batch is filtered at room temperature and the sodium chloride is washed with 5×400 parts of xylene which is then evaporated under a pressure of 15 mm. Hg and the residue is kept for 1 hour at 100° C. under a pressure of 1 mm. Hg.

Yield: 978 parts of dimeric 1:4-bis(cyclopentadienyl)-trans-butene-2 [=93.2% of the theoretical yield calculated from 1:4-dichlorobutene-(2)] as a light-brown, viscous oil having a specific gravity of 1.04 g./cc. at 20° C. and a viscosity of 83,000 centipoises at 20° C.

| Analysis | Calculated, percent | Found, percent |
|---|---|---|
| C | 91.25 | 90.1 |
| H | 8.75 | 9.0 |

Molecular weight: 368.

The liquid dimeric 1:4-bis(cyclopentadienyl)-trans-butene-2 obtained as described above is poured into moulds 42 x 11 x 130 mm. and 130 x 130 x 2 mm. respectively and cured under the conditions shown below, whereupon hard, clear, perfect castings are obtained which have the following properties.

(a) Mechanical and ageing properties:

| Specimen | Curing conditions | Flexural strength, kg./mm.$^2$ | Impact strength, cm.kg./cm.$^2$ | Modulus of elasticity, kg./mm.$^2$ | Heat distortion point accg. to Martens (CIN) ° C. | Water absorption after 1 hour at 100° C., percent |
|---|---|---|---|---|---|---|
| 1 | 12h/160° C.+6h/180° C. | 5.7 | 3.5 | 481 | 100 | 0.04 |
| 2 | As 1+6h/200° C. | 5.7 | 3.4 | 448 | 218 | 0.05 |
| 3 | As 2+6h/220° C. | 6.3 | 3.25 | 478 | 234 | 0.04 |
| 4 | As 3+6h/220° C. | 5.1 | 3.1 | 495 | 245 | 0.06 |

Flexural strength after ageing (Specimen 4):
  10 days at 140° C.=6.5 kg./mm.$^2$.
  30 days at 140° C.=4.0 kg./mm.$^2$.
Specific weight at 20° C. (Specimen 4):
  1.08 g./cc.

(b) Dielectric properties—

(α) Dependence of loss factor $tg\delta$ and of dielectric constant $\epsilon$ of the castings (Specimen 4) on the frequency at 20° C.:

| Frequency, c.p.s. | $tg\delta \times 10^2$ [20° C.] | $\epsilon$ [20° C.] |
|---|---|---|
| 50 | 0.01 | 3.1 |
| 10$^4$ | 0.53 | 2.35 |
| 10$^5$ | 0.49 | 2.30 |
| 10$^6$ | 0.45 | 2.45 |
| 10$^7$ | 0.36 | 2.44 |
| 5×10$^7$ | 0.33 | 2.37 |
| 10$^8$ | 0.83 | 2.46 |
| 2.5×10$^8$ | 1.05 | 2.38 |
| 0.96×10$^{10}$ | 0.1 | 3.04 |

(β) Dependence of loss factor $tg\delta$, dielectric constant $\epsilon$ and specific resistance of the castings (Speciment 4) on the temperature at 50 cycles per second:

| Temp., ° C. | $tg\delta \times 10^2$ [50 c.p.s.] | $\epsilon$ [50 c.p.s.] | Specific resistance, ohm-cm.$^{-1}$ |
|---|---|---|---|
| 25 | 0.01 | 3.1 | 2×10$^{17}$ |
| 50 | 0.05 | 3.1 | 2.7×10$^{16}$ |
| 75 | 0.02 | 3.1 | 1.3×10$^{16}$ |
| 100 | 0.01 | 3.1 | 1.1×10$^{16}$ |
| 125 | 0.02 | 3.1 | 1.1×10$^{15}$ |
| 150 | 0.01 | 3.1 | 3.4×10$^{14}$ |
| 175 | 0.1 | 3.2 | 2.4×10$^{14}$ |
| 200 | 0.3 | 3.2 | 5.5×10$^{13}$ |
| 225 | 1.0 | 3.2 | 5.5×10$^{12}$ |
| 240 | 2.26 | 3.2 | 1.6×10$^{12}$ |

(c) Chemical stability:

| Medium | Temperature, ° C. | Increase in weight of castings in percent | |
|---|---|---|---|
| | | After 10 days | After 30 days |
| Water | 75 | 0.17 | 0.32 |
| Concentrated hydrochloric acid | 20 | 0.53 | 0.87 |
| Sodium hydroxide solution (30%) | 20 | 0.08 | 0.09 |
| Glacial acetic acid | 20 | 0.21 | 0.37 |
| Acetone | 20 | 0.46 | 1.03 |
| Toluene | 20 | 0.20 | 0.52 |

The specimens immersed in the above-mentioned media did not display any visible signs of attack.

EXAMPLE 2

In this example the pot life of dimeric 1:4-bis-(cyclopentadienyl)-butene-2 is compared with that of dimeric α:α'-bis(cyclopentadienyl)-para-xylene described in U.S. Patent No. 2,726,232. This comparison was performed by way of the so-called "accelerated ageing test" in which the substance was stored at 60° C.

The respective behavior of the two substances is shown in the accompanying diagram which shows the storage time in hours plotted on a logarithmic scale on the abscissa and, as a function thereof, the viscosities in centipoises for 1:4-bis(cyclopentadienyl)-butene-2 (=graph I) and for α:α'-bis(cyclopentadienyl)-para-xylene (=graph II) likewise on a logarithmic scale on the ordinate. From the shape of graph I it will be seen that the viscosity of dimeric 1:4-bis(cyclopentadienyl)-butene-2 stored for 25 days (600 hours) at 60° C. had changed only to a minor degree, whereupon the test was discontinued.

On the other hand, as revealed by graph II, dimeric α:α'-bis(cyclopentadienyl)-para-xylene stored at 60° C. displayed after only 2 hours a viscosity exceeding 6000 centipoises. Tests have shown that the viscosity of the casting resin at 60° C. must not exceed 6000 centipoises to ensure that useful, bubblefree castings are obtained.

When dimeric 1:4-bis(cyclopentadienyl)-butene-2 is stored even for as long as a fortnight at 100° C., its viscosity is only doubled and the product is still castable. In contradistinction thereto dimeric α:α'-bis(cyclopentadienyl)-para-xylene gels at 100° C. after only 40 minutes and forms an elastic, solid substance.

The dimeric α:α' - bis(cyclopentadienyl)-para-xylene used in the ageing test was prepared as follows:

138 parts of metallic sodium in the form of small particles of about 20μ diameter are suspended in
900 parts of anhydrous tetrahydrofuran.
18 parts of tertiary butanol are added and while cooling externally
435.6 parts of monomeric cyclopentadiene are stirred in at a rate such that the reaction mixture refluxes gently at 40 to 45° C. The reaction is allowed to subside over a period of 3½ hours, and while again cooling the whole externally a solution of
516 parts of α:α'-dichloro-para-xylene in
1350 parts of tetrahydrofuran is stirred in dropwise at an internal temperature of 30 to 35° C. The batch is stirred for 16 hours at room temperature and then neutralized with acetic acid. The precipitated sodium chloride is filtered off, the filter residue is repeatedly rinsed with xylene and the clear filtrate is heated for 2 hours at 70° C. The solvents are then evaporated under reduced pressure at 40° C. in a falling-film evaporator, finally under a pressure of 1 mm. Hg, to yield
475 parts of dimeric α:α'-bis(cyclopentadienyl)-para-xylene in the form of a red-brown liquid.
Molecular weight: found 465; calculated 468.

EXAMPLE 3

Manufacturing a glass fiber laminate

Glass fiber fabric having a weight of 193 g. per square meter is impregnated with dimeric 1:4-bis(cyclopentadienyl)-trans-butene-(2) which has been prepared as described in Example 1. A sandwich of 12 plies of this impregnated fabric, 15 x 15 cm., is subjected to a preliminary gelling for 6 hours at 170° C. under a slight pressure. Press lines of polytetrafluoroethylene (registered trade mark "Teflon") are then placed on both sides of the sandwich and the whole is heated for 1 hour at 220° C. under a pressure of 80 kg./cm.². The laminate is hard at elevated temperatures, and the press lines can be readily removed at elevated temperature. The laminate possesses the following properties:

Impact strength _____ 99.1 cm.kg./cm.².
Flexural strength _____ 23.4 kg./mm.².
Flexural strength after 1 hour's immersion in boiling water _____ 22.2 kg./mm.².
Water absorption after 1 hour at 100° C. _____ 0.74%
Heat distortion point according to Martens (DIN) _____ 112° C.

What is claimed is:
1. A process for the manufacture of cured polymeric resins wherein dimeric 1,4-bis(cyclopentadienyl)-butene-2, said dimeric 1,4-bis(cyclopentadienyl)-butene-2 being liquid and substantially stable at room temperature and being obtained by heating monomeric 1,4-bis(cyclopentadienyl)-butene-2 to a temperature of from about 70° C. to about 150° C., is heated to a temperature of from about 160° C. to about 220° C.

2. Dimeric 1,4-bis(cyclopentadienyl)-butene-2, said dimeric 1,4-bis(cyclopentadienyl)-butene-2 being liquid and substantially stable at room temperature and being obtained by heating monomeric 1,4-bis(cyclopentadienyl)-butene-2 to a temperature of from about 70° C. to about 150° C.

3. The cured, insoluble and infusible polymeric resin obtained by heating dimeric 1,4-bis(cyclopentadienyl)-butene-2 to a temperature of from about 160° C. to about 220° C., said dimeric 1,4-bis(cyclopentadienyl)-butene-2 being liquid and substantially stable at room temperature and being obtained by heating monomeric 1,4-bis(cyclopentadienyl)-butene-2 to a temperature of from about 70° C. to 150° C.

References Cited by the Examiner
UNITED STATES PATENTS
2,726,232  12/55  Upson _____ 260—93.1

JOSEPH J. SCHOFER, *Primary Examiner.*